United States Patent

Perchak

[19]

[11] Patent Number: 5,923,426
[45] Date of Patent: Jul. 13, 1999

[54] BI-LATERAL SHEARING INTERFEROMETER

[75] Inventor: Robert M. Perchak, Dayton, Ohio

[73] Assignee: Mirage Development, Ltd., Dayton, Ohio

[21] Appl. No.: 09/121,985

[22] Filed: Jul. 24, 1998

Related U.S. Application Data

[60] Provisional application No. 60/053,621, Jul. 24, 1997.

[51] Int. Cl.⁶ ................................................ G01B 9/02
[52] U.S. Cl. ............................ 356/353; 356/399; 356/400
[58] Field of Search .................................. 356/353, 399, 356/400

[56] References Cited

U.S. PATENT DOCUMENTS

| | | | |
|---|---|---|---|
| 4,304,464 | 12/1981 | Hiu et al. | 356/353 |
| 4,541,720 | 9/1985 | Hausler et al. | 356/353 |
| 4,662,750 | 5/1987 | Barger | 356/353 |
| 5,426,503 | 6/1995 | Kusunose | 356/353 |

Primary Examiner—Robert H. Kim
Attorney, Agent, or Firm—Joseph G. Nauman

[57] ABSTRACT

Opposite wedge plates having identical non-parallel surfaces are joined to provide an optical element which will receive a portion (e.g. one-half) of an collimated input light beam, and project the side-by-side interference patterns directly onto a viewing screen to check for collimation of the beam. The instrument incorporates a rectangular, preferably cube shaped, housing having an input window in one side of the housing for admission of the beam being investigated, and a viewing window in another side located at right angles to the input window. A viewing screen (such as a diffusing plate) is fitted into or supported in the viewing window. The optical element is supported in and across the housing extending at forty-five degrees to the input window, from a corner adjacent the viewing window to an opposite corner. The optical element comprises a matched pair of optical wedge plates having the same wedge angle and being supported side-by-side with their wedge directions opposite. The wedge plates are fabricated by splitting a source plate across the direction of the interference fringes of the source plate and rejoining the resulting pair of wedge plates with their wedge directions opposite.

9 Claims, 3 Drawing Sheets

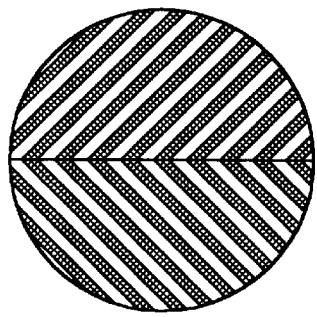 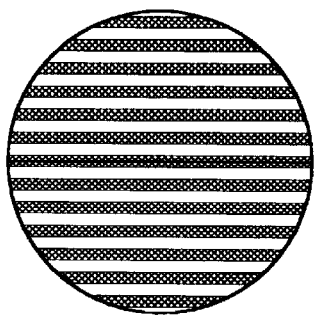 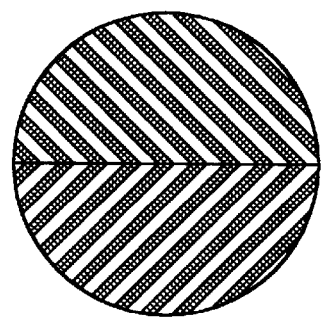
FIG. 3A    FIG. 3B    FIG. 3C
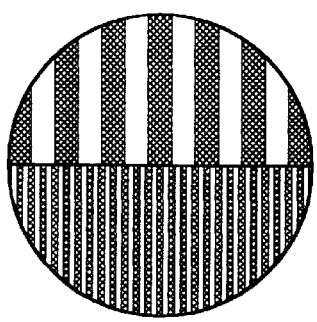 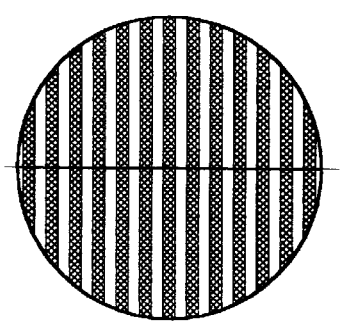 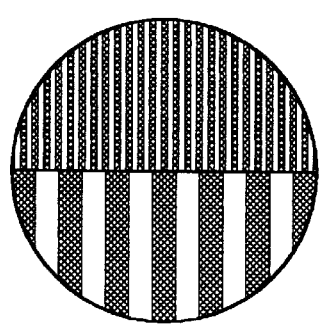
FIG. 4A    FIG. 4B    FIG. 4C
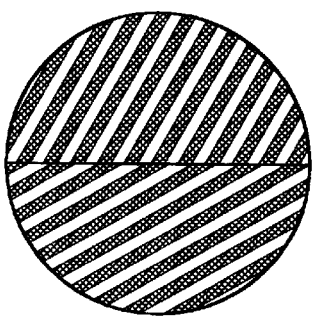 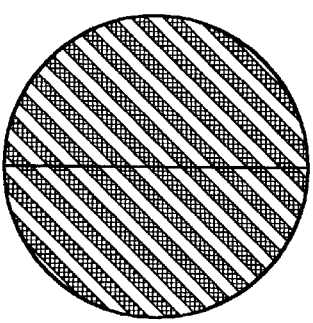 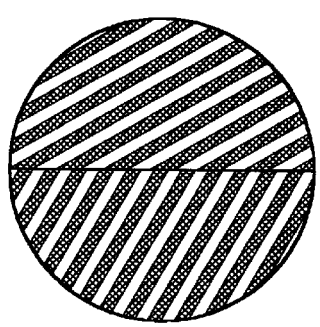
FIG. 5A    FIG. 5B    FIG. 5C

BI-LATERAL SHEARING INTERFEROMETER

CROSS-REFERENCE TO RELATED APPLICATIONS

This application is related to U.S. Provisional Application Ser. No. 60/053,621 filed Jul. 24, 1997.

FIELD OF THE INVENTION

This invention relates to a modification and improvement of a conventional shearing interferometer for collimation testing such as determining the center of a beam of coherent light.

BACKGROUND OF THE INVENTION

One method of setting the collimation of a beam of coherent light is to input a Gaussian cross-section light beam, such as that from a laser, and then physically to adjust the collimator (e.g. reverse telescope) to produce what appears to be a parallel beam or collimated beam of light. The diameter of the beam can be measured at various distances from the collimator and compared to that predicted by Raleigh-Gaussian beam propagation theory.

Another way is to pass the beam into a distance simulating apparatus. This is composed of a collimator or beam expander followed by a telescope. The light that is being measured for collimation can be input to this apparatus and the output can be made to simulate the spot size that would be obtained at some desired range from the input beam in question. This type of apparatus requires diffraction limited optics throughout and is quite expensive.

A number of printed articles have been located which relate to this subject. These are: Self-referencing Collimation Testing Techniques; K. V. Sriram; M. P. Kothiyal; R. S. Sirohi; January 1998, Vol. 32, No. 1, Optical Engineering.

This paper describes a number of dual-field grating types of shearing interferometers. In particular, the paper describes a double-wedge plate shearing interferometer used for collimation testing, with the fringe pattern in one plate providing a reference for the other. It recognizes that use of two round wedges results in wide separation between the two fields and makes for difficulty in judging the collimation position. As a result the authors developed a double-wedge plate as a single optical component. Using a single elongated source wedge plate (FIG. 10a) in which the wedge direction is parallel to the greater (elongated) direction, that plate has only long edge DC cut and polished, then the plate is cut in two cross-wise, bisecting the polished edge, and the resultant two polished edges CF and FD are joined. Thus, the wedge direction of the two halves of the resulting optical element are opposite (see FIG. 10B).

In order to secure essentially the same fringe patterns (for accurate comparison) it is necessary that the number of fringes and their spacing be uniform over the length of the original or source plate (FIG. 10a). This introduces stringent requirements into the manufacture of a double-wedge plate, both as to the supply and/or selection of the original or source plate, and as to the splitting and joining of the single source plate into a double-wedge plate which is capable of producing closely matched images for accurate and easily used adjacent images.

2. The Use of a Single Plane Parallel Plate as a Lateral Shearing Interferometer with a Visible Gas Laser Source; (M. V. R. K. Murty; April 1964/Vol. 3, No. 4/ Applied Optics);

A high-intensity interference pattern can be obtained in a shearing interferometer with the use of a visible gas laser and a simple construction. The high intensity of the laser per unit of solid angle gives an interference pattern that is visible in room light. The narrow spectral width of the source allows a simple plane parallel plate to be used to obtain the desired shear.

3. Double Wedge Plate Shearing Interferometer for Collimation Test; Bajpal S. Sirohi and Mahendra P. Kothiyai; (Applied Optics/Vol. 26, No. 19/Oct. 1, 1987).

This paper describes a means of comparing fringe patterns from two separate shear plates where the wedge angles are perpendicular to the reflected light. The comparative fringe patterns then rotate with respect to each other, but do not change size (line space frequency) with respect to each other.

4. Rotatable Single Wedge Plate Shearing Interference Technique for Collimation Testing; De-Yan Xu, K. J. Rosenbruch; (Optical Engineering; /April 1991/Vol 30 No. 4);

Describes the basic theory and technique of a collimation testing method based on analysis of the lateral shearing interference fringes. The changing fringe spacing and the orientation after rotation of a single wedge plate through 180 degrees indicate the degree of collimation of the light beam. The preliminary experimental equipment is described, precision analyses are presented, and the usefulness for practical applications is demonstrated.

5. Half-Aperture Shearing Interferometer for Collimation Testing; Yun Woo Lee, Hyun Mo Cho, In Von Lee; (Optical Engineering—November 1993/Vol. 32 No. 11);

A half-aperture shearing interferometer for collimation testing is proposed. It consists of a wedge plate, two plane mirrors, and two baffles. Detailed analyses for three configurations of the system are presented.

Also, U.S. Pat. No. 4,756,175 issued Nov. 22, 1988, discloses a rotatable Shear-Plate Interferometer employing a rotatable shear plate mounted within a tubular support at a 45 degree angle to the center axis of the support. The tubular supporting member is itself rotatably mounted about its center axis and a collimated laser beam can be directed incident to the shear plate along the center axis and the plate rotated defocus of the beam in different directions can be measured.

SUMMARY OF THE INVENTION

The primary objective of this invention is to develop a simple and easy to manufacture shearing interferometer, preferably portable, for measuring the degree of collimation of a coherent light source (e.g. a laser) used to establish alignment(s) in construction projects, machinery and other uses where a laser beam is directed over substantial distances. This ordinarily results in some spreading of the beam, and it is necessary to locate the center of the beam at long distances (e.g. 40 to 100 meters or more) from the beam source. The invention utilizes the image shearing interferometer for collimation measurement and improves the sensitivity of the technique at the least by a factor of two.

In accordance with the invention, a simple image shearing (shifting) plate interferometer is comprised of a transparent double-wedge optical element (plate) located at an angle (preferably 45 degrees) from the incoming beam to be measured, as is described in the above identified prior art. The basic principle of operation involves directing a coherent beam of light, to be measured for collimation input, along a determined axis incident at 45 degrees onto the double-wedge element reflecting/refracting sides. Some of the light reflects off a first surface of each of the wedge plates and interferes with light reflected off the second or other surfaces of the wedge plates.

This first and second reflected light is directed to a view screen, where there appears a resultant side-by-side images of the interference patterns from each wedge plate of the optical element.

The comparative fringe patterns do not rotate with respect to each other, but the number of fringes increases on one side with respect to the other, depending upon whether a diverging or converging beam is directed onto the double-wedge plate element. When the fringe spacing on both sides of the viewing screen appears identical, this indicates a collimated input beam.

In a preferred embodiment of the invention the two wedge plates having non-parallel surfaces arranged to receive a portion (e.g. one-half) of the input light beam, and project the side-by-side interference patterns directly onto a viewing screen. The instrument incorporates a rectangular, preferably cube shaped, housing having an input window in one side of the housing for admission of the beam being investigated, and a viewing window in another side located at right angles to the input window. A viewing screen (such as a diffusing plate) is fitted into or supported in the viewing window. The optical element is supported in and across the housing extending at forty-five degrees to the input window, from a corner adjacent the viewing window to an opposite corner. This is believed to be the simplest and most economical arrangement, retaining a high degree of accuracy and ease of comparison of the two images, and being capable of holding in one hand of the user.

Other objects and advantages of the invention will be apparent from the following description, the accompanying drawings and the appended claims.

BRIEF DESCRIPTION OF THE DRAWINGS

FIGS. 3A, 3B and 3C show the interference patterns displayed if the wedge directions are normal to the shearing direction and with divergent, collimated, and convergent input beams respectively;

FIGS. 4A, 4B, and 4C show the interference patterns displayed if the wedge directions are parallel to the shearing direction and with divergent, collimated and convergent input beams respectively;

FIGS. 5A, 5B, and 5C show the interference patterns displayed if the wedge directions are not normal to the shearing direction and with divergent, collimated, and convergent input beams, respectively;

DESCRIPTION OF PREFERRED EMBODIMENT

Figure 1:
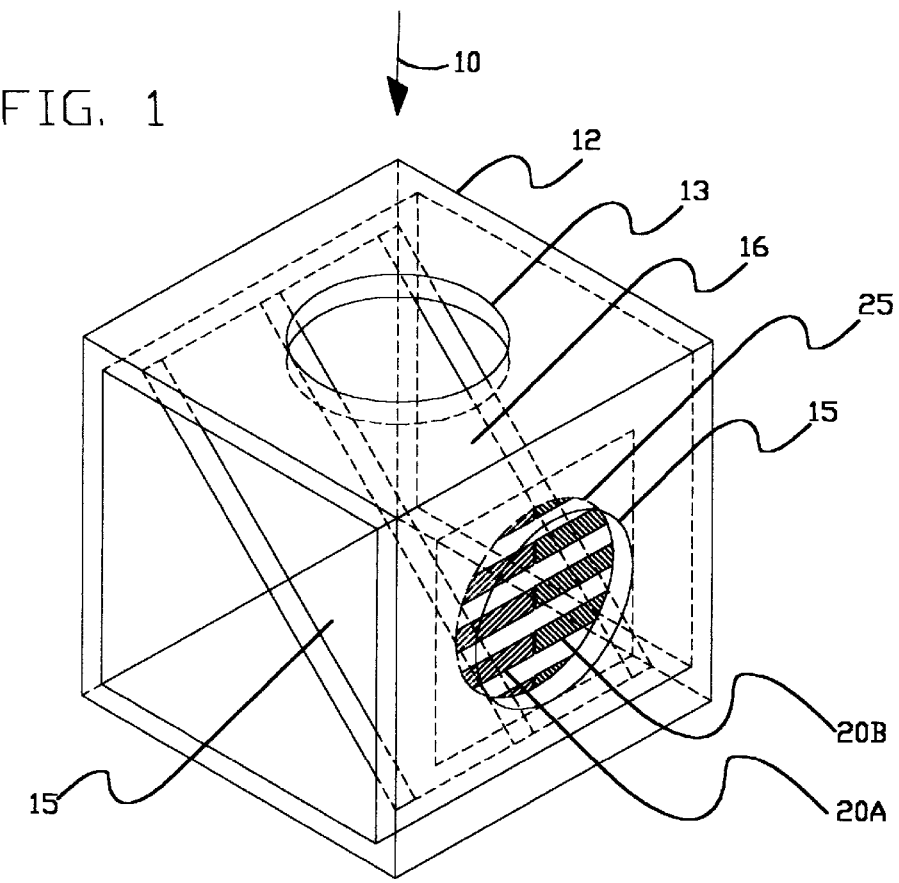
FIG. 1 is a perspective view, with the outer housing in phantom lines, of a dual-wedge plate collimation testing shearing interferometer according to the invention.
Figure 2:
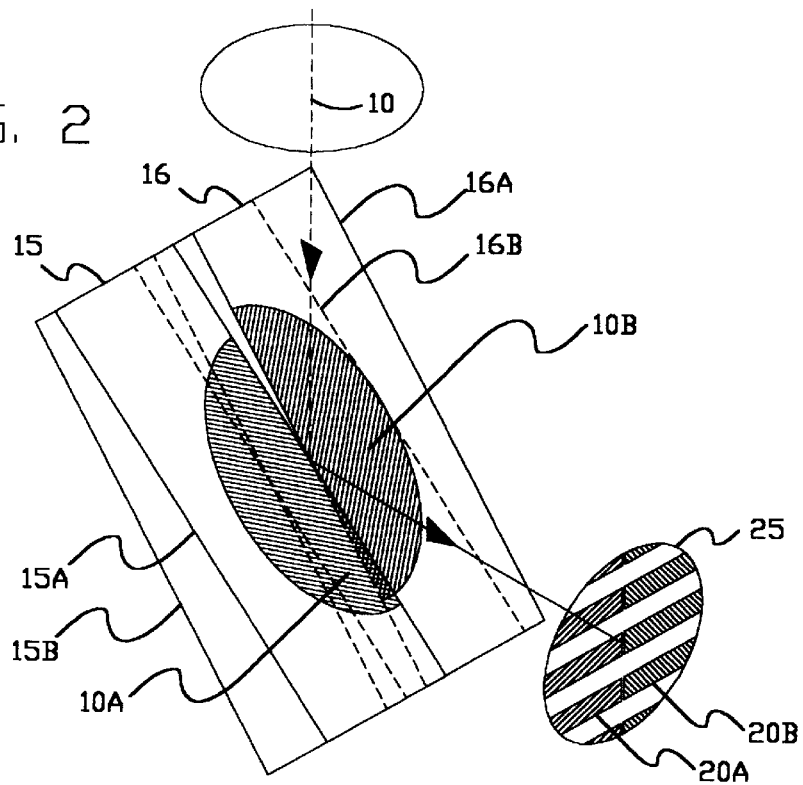
FIG. 2 is a perspective view of the preferred embodiment of an interferometer device according to the invention.

A preferred embodiment of the invention is shown in FIGS. 1 and 2. The device has a housing 12 which is shown in phantom as being a generally cubic member, and which is provided with an entrance (input) window or aperture 13 through which the beam 10 under inspection will enter, and a viewing (output) window 15 having a viewing screen 25 on which a pair of images from the beam are directed side by side. The image includes a first portion 20A resulting from the incoming beam 10 as it is incident on a first wedge 15 and the second or remaining portion 20B resulting from the incoming beam 10 as it is incident on a second adjacent wedge 16. It is preferred that the beam portions be equal so as to form the image portions 20A, 204B as complementary parts of a symmetrical image of the shearing interference patterns. The angles of the wedges, i.e. the angularity between their front and rear surfaces 15A, 15B and 16A, 16B are non-parallel, having a selected angle between the planes of those respective surfaces on each wedge. This angularity should be the same for both wedges, and is typically in the order of 20 arcseconds.

The portion 10A of input beam 10 will be reflected by the front and rear surfaces 15A and 15B of wedge 15, and generate a first shearing interference pattern, which is image portion 20A, that may be viewed on screen 25. Similarly the other portion 10B of the incoming beam 10 is reflected off the front and rear surfaces 16A and 16B of wedge 16 and generates a second shearing interference pattern, which is the image portion 20B, in the opposite direction.

Producing two adjacent precision optical wedges whose wedge angles are opposing, and which in collimated light produce equivalent fringe patterns, is extremely difficult and does not easily lend itself to conventional optical production techniques. Typically, it would be necessary to produce many wedges and test each one interferometrically, and attempt to produce sets (e,g, matched pairs) that have mostly equivalent fringes. In order to design an improved production method it is important first to understand what types and variation of fringe patterns might be tolerated and still produce the desired measurement and comparson results.

In this embodiment of the invention, the number of fringes displayed in each wedge is illustrated as 6 to 8 over approximately 1 cm. field of view. This is just an example, and the number of fringes of fringes could be less, e.g. 3 to 5 fringes over a 1 cm. field of view.

Referring to FIGS. 4, 5, 6 & 7, FIGS. 4A & 4B display the preferred fringe pattern, which exhibits generally straight and evenly spaced line patterns, as in FIG. 4A. FIGS. 5A, 6A, & 7A show typical patterns obtained on glass samples. The patterns have a degree of symmetry along the wedge direction BC-GF and also display symmetry transverse to BC-GF and along an axis J-K. If these samples are carefully cut and separated along the BC-GF line of symmetry and then rearranged by rotating one of the wedges so that C is adjacent G and F is adjacent B, then it will be seen that in each case (as shown in 5B, 6B & 7B) the fringes along BG are equivalent to those along FC. It follows that the method described which uses the symmetry of fringes to choose an appropriate single piece of optical material enables the cutting and separating of a single glass sample or source plate into two wedges that produce equivalent fringes in each wedge along the line of separation, superior to the selection and matching of individually manufactured wedges, and much easier and less expensive than dividing a relatively longer source plate across the wedge direction as taught in the Sriram et al publication in Optical Engineering, 1993, discussed above.

Figure 6A:
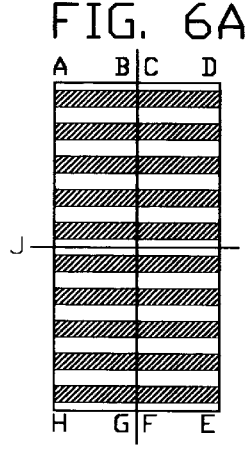
FIGS. 6A illustrates a most frequently found interference pattern.
Figure 6B:
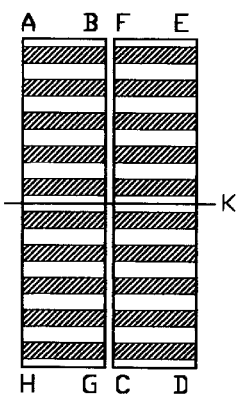
FIG. 6B illustrates the interference pattern displayed when the glass sample of FIG. 6A is cut and the two resulting wedges reversed to provide the dual wedges as used in the preferred embodiment.
Figure 7A:
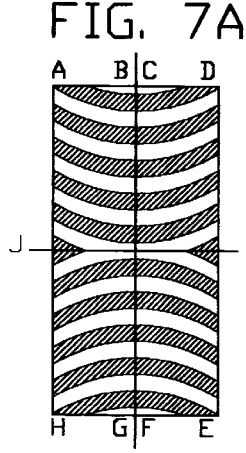
FIG. 7A is a sample which will exhibit sets of interference lines which appear as convex and concave.
Figure 7B:
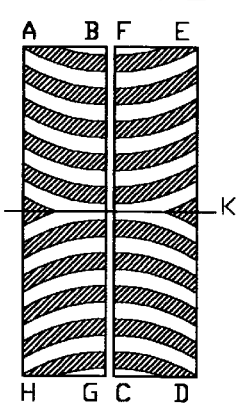
FIG. 7B illustrates the patterns displayed by two wedges produced from the glass sample shown in FIG. 7A.
Figure 9A:
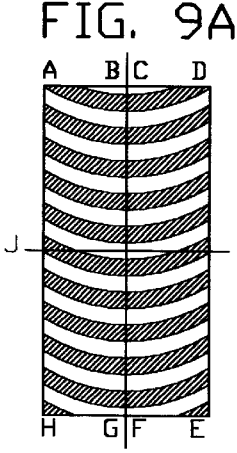
FIGS. 9A & 9B represent the interference lines resulting from a further sample and resultant two wedges.
Figure 9B:
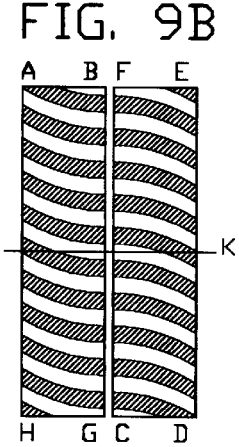
Figure 8A:
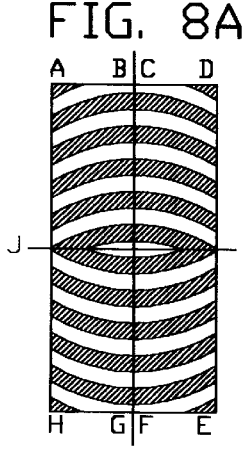
FIGS. 8A & 8B represent the interference lines produced from a sample which is the reverse of FIG. 7A.
Figure 8B:
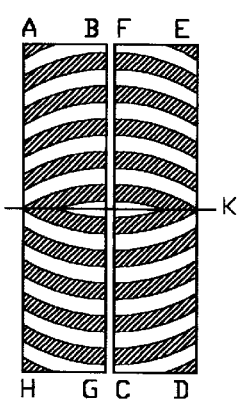

By following the method disclosed herein, it is considerably easier to locate source plates which have a consistent fringe pattern, the best choice of course being as shown in FIG. 6, with the understanding that patterns as exemplified in FIGS. 7, 8 & 9 are satisfactory. It is, of course, easier to locate consistently spaced and shaped finges in source plates of smaller lengths. It should also be noted in the herein described a preferred embodiment there is a requirement for high quality interference patterns to be obtained. This is important so as to facilitate good judgment of a person observing and comparing the adjacent displayed images in determining the degree of collimation of the input beam.

The embodiment shown in FIG. 1 and FIG. 2 displays interference fringes on the viewing screens 25, as shown in FIGS. 3A–C, 4A–C and 5A–C. FIGS. 3A, 3B and 3C show the interference patterns if the wedge directions are normal to the shearing direction and with divergent (FIG. 3A), collimated (FIG. 3B), and convergent (FIG. 3C) input beams, respectively. FIGS. 4A, 4B, and 4C show the interference patterns if the wedge directions are parallel to the shearing direction and with divergent (FIG. 4A), collimated (FIG. 4B), and convergent (FIG. 4C) input beams respectively. FIGS. 5A, 5B and 5C show the interference patterns if the wedge directions are not normal to the shearing direction and with divergent (FIG. 5A), collimated (FIG. 5B), and convergent (FIG. 5C) input beams respectively.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A portable dual-wedge plate interferometer for testing collimation of a beam, comprising a housing having an input window for receiving the beam to be investigated and a viewing window at which adjacent images are displayed according to the collimation of the beam as it enters said input window, an optical element within said housing, said optical element including a matched pair of optical wedge plates having the same wedge angle and being supported side-by-side with their wedge directions opposite, said pair of wedge plates being obtained by splitting a source plate across the direction of the interference fringes of the source plate and rejoining the resulting pair of wedge plates with their wedge directions opposite.

2. An interferometer as defined in claim 1, wherein said wedge plate extends at forty-five degrees to the axis of the input window.

3. An interferometer as defined in claim 2, including a diffuser plate supported in said viewing window and providing a viewing screen for the images, said wedge plate also extending at forty-five degrees to said to said viewing screen.

4. An iterferometer as defined in claim 3, wherein the adjacent fringe line images are back projected onto said diffuser plate for viewing frm the exterior of said viewing window.

5. A dual-wedge plate for an interferometer used for testing collimation of a beam, comprising an optical element within said housing consisting of a matched pair of optical wedge plates having the same wedge angle and being supported side-by-side with their wedge directions opposite, said pair of wedge plates each having first and second sides and being fabricated by splitting a source wedge plate across the direction of the interference fringes of the source plate and mounting the sides of the resulting pair of wedge plates with their wedge directions opposite to form the optical element.

6. A dual-wedge plate as defined in claim 5, wherein the pair of wedge plates are rejoined at their severed edges.

7. A dual-wedge plate as defined in claim 5, wherein the wedge angle of the plates is in the order of 20 arcseconds.

8. A dual-wedge plate as defined in claim 5, wherein the first sides of the pair of wedges are coplanar, and the second sides of the pair of wedges intersect at the center of the resultant optical element.

9. The method of fabricating a dual-wedge interferometer plate optical element for testing collimation of a beam, comprising the steps of a) providing a transparent source wedge plate having a predetermined wedge angle and having a width in the wedge direction comparable to the desired width of the optical element and having a predetermined interference fringe pattern, b) separating said source plate along the center of its width and across the direction of the fringe pattern into a matched pair of optical wedge plates having the same wedge angle and being supported side-by-side with their wedge directions opposite, and c) rejoining the resulting pair of wedge plates with their wedge directions opposite.

* * * * *